Oct. 27, 1959 E. G. SPISAK 2,910,323
WHEEL COVER
Filed May 9, 1957
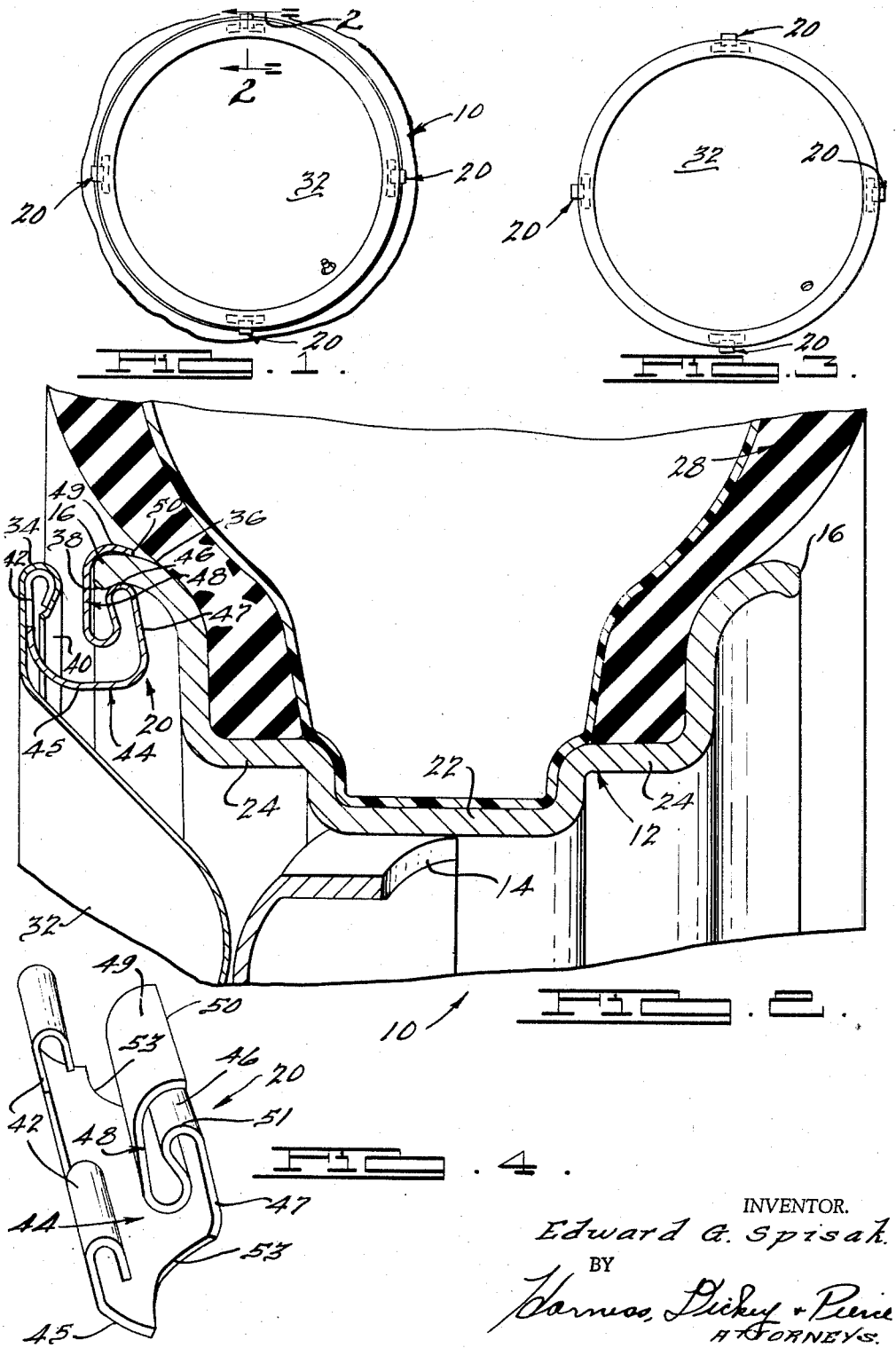
INVENTOR.
Edward G. Spisak
BY
Harness, Dickey & Pierce
ATTORNEYS.

ns Patent Office
2,910,323
Patented Oct. 27, 1959

2,910,323
WHEEL COVER

Edward G. Spisak, Wayne, Mich., assignor to Gar Wood Industries, Inc., Wayne, Mich., a corporation of Michigan Application May 9, 1957, Serial No. 658,047

2 Claims. (Cl. 301—37)

This invention relates to improved wheel trim retaining devices, and more particularly to an improved spring clip for retaining a wheel trim member upon the face of an automobile wheel.

Despite relatively intensive past development work in the field of automobile wheel trim discs, or rings, and of retaining means for securing them to automobile wheels, many problems still remain; particularly those pertaining to the prevention of rattling and indexing, to the provision of optimum retaining force, to interchangeability among covers and wheels, and to cost reduction. Efforts have been directed especially toward the development of attachment means adapted to hold a trim member securely upon a wheel despite dimensional variations due to so-called tolerance factors and to road shocks, yet which permits the trim member to be removed when desired without the use of special tools or excessive force.

Most automobile wheels are manufactured to relatively wide dimensional tolerances, different wheels of the same nominal size differing substantially in diameter. Moreover, for the economical production of wheel trim members it is also desirable to allow relatively wide tolerances in the dimensions of the trim members themselves. At least partly because of these tolerance factors, which in certain instances may be cumulative and result in a relatively large misfit between a small trim member, for example, and a large wheel, it has heretofore been relatively difficult to manufacture an inexpensive attaching device of an entirely satisfactory nature.

Accordingly, one important object of the present invention is to provide an improved wheel trim retaining device capable of securely retaining a wheel trim on an automobile wheel during even relatively rough service use.

Another object is to provide an improved retaining clip for securing a wheel trim member upon the face of an automobile wheel with substantially equal retaining power regardless of variations in size of the wheels and the trim members throughout normal commercial tolerance ranges.

Another object is to provide an improved retaining clip for an automobile wheel trim member engageable on the terminal rim flange of the wheel for securely holding the trim member on the wheel, yet still being readily removable for service purposes.

A still further object is to provide a one piece spring clip for retaining a wheel trim member on an automobile wheel and including a terminal leg extending over the edge of the wheel rim flange and engaging the radially outer surface thereof, to urge another portion of the clip against the radially inner surface of the flange for retaining engagement therewith.

Another object is to provide an improved wheel trim retaining clip including a generally C-shaped gripping portion for pinching retaining engagement with an axially extending wheel flange, and a radially deflectable supporting portion connecting the gripping portion with the trim member, the supporting portion being more easily yieldable radially than to the gripping portion.

Another object is to provide an improved wheel trim retaining clip including a relatively small, C-shaped, gripping portion integral with and disposed partially within a relatively large U-shaped supporting portion, and being arranged to grip a wheel flange, the supporting portion being larger and more easily yieldable than the gripping portion to accommodate dimensional differences between the trim member and the wheel without loosening the grip of the clip upon the wheel.

These and other objects are accomplished by the present invention according to which a wheel trim member is retained upon the face of a wheel of the type having an outwardly curled terminal rim flange by means of a spring clip including an axially extending, radially deflectable supporting portion rigidly affixed to the trim member and extending in cantilever fashion axially inwardly toward the wheel. A C-shaped gripping portion is formed integrally with the supporting portion, and engages the terminal rim flange with a pinching action. The supporting portion yields more easily than the gripping portion when the clip is stressed, and thus accommodates dimensional variations between the wheel and the trim member without loosening the grip of the C-shaped portion upon the wheel rim flange. The gripping action of the clip is remarkably strong, even a single clip alone providing sufficient retaining force to hold the trim member on the wheel.

The invention will now be described in greater detail in connection with the accompanying drawing:

Figure 1 is an elevational view of an automobile wheel including an ornamental wheel cover secured to the wheel by four clips according to the present invention;

Fig. 2 is a fragmentary, cross-sectional view of the wheel as shown in Fig. 1 taken along the section line 2—2 thereof;

Fig. 3 is a rear elevational view of a wheel cover including four clips according to the invention mounted thereon; and Fig. 4 is an isometric view of a spring clip according to the invention.

Referring now to the drawing, a conventional automobile wheel 10 is shown therein including a drop center rim 12 securely affixed to a load bearing body portion 14. The rim 12 has an axially extending, curled, terminal rim flange 16, which the clip 20 of the present invention is adapted to engage. The details of the wheel construction, except for the presence of the axially extending terminal rim flange 16 are in no way critical with respect to the present invention and may be varied as desired. Typically, as shown, the rim 12 includes a drop center portion 22, and intermediate axial flange portions 24 which support a pneumatic tire 28.

A sheet metal wheel cover 32 which may be of any desired ornamental shape is mounted upon the outer face of the wheel 10 in overlying relationship thereto. The cover 32 is of approximately the same diameter as the terminal rim flange 16, so that when it is positioned upon the wheel it substantially completely covers the wheel and conceals it. In so far as the practice of the present invention is concerned, the cover 32 need not be disc shaped as illustrated, but may be in the form of a ring, or annulus.

The cover 32 is secured to the wheel 10 by a plurality of clips 20, the number of which is not critical, four being shown illustratively. Preferably, at least three of the clips 20, equiangularly spaced around the cover 32, are used to insure stability of the cover on the wheel during operation. These clips 20 are rigidly fixed to the cover 32 and extend axially in cantilever fashion toward the wheel, and engage the outer extremity of the terminal rim flange 16, holding the outer edge 34 of the cover spaced apart from the rim flange 16. The cover 32 is supported away from the wheel 10 to minimize the generation of noises such as rattling during operation of the wheel, to permit air to circulate freely through the wheel, and to prevent trapping of water and dirt between the cover and the wheel.

Many different arrangements have previously been proposed for securing a wheel cover to a wheel by snap spring on biting engagement with the radially inner face of the terminal rim flange, but these prior arrangements have not found wide acceptance. It has been difficult to devise such an arrangement having sufficiently uniform retention characteristics, especially in view of the tolerance factors that must be accommodated, and the cost limitations imposed by the competitive nature of the market. The clips 20 of the present invention not only exert a relatively powerful retaining force and hold the cover 32 spaced from the wheel, but also satisfy the other requirements, being sufficiently flexible to accommodate the greatest commercially acceptable tolerance factor variations without significant loosening of their grip on the wheel, and being relatively inexpensive to manufacture.

Each one of the spring clips 20 includes a first, generally U-shaped supporting portion 44, the axially outer leg 42 of which is firmly secured to the cover 32 along the outer edge 34 thereof. The clips 20 may be welded to the cover or, as illustrated, they may be clinched in a terminal bead 40 on the cover. The outer leg 42 of the U-shaped portion 44 is folded over at its upper end and fitted within the bead 40, which is then firmly pressed upon the folded over portion of the leg 42 to clinch the clip securely and permanently in position on the cover 32. In order to facilitate clinching the clip 20 in the cover bead 40, to reinforce the cover bead 40, and to provide ample engagement of the clip 20 within the bead 40, the outer leg 42 of the supporting portion 44 of the clip is preferably made relatively wide, and may be bifurcated as illustrated. This arrangement provides a relatively strong connection between the cover 32 and the clip 20, which is highly resistant to angular movement of the clip relative to the cover about an axis parallel to the axis of the wheel, and which secures the clip permanently to the cover even when the cover 32 is made of relatively thin sheet metal. It also makes the leg 42 readily accessible to a clinching tool for securing the clip 20 to the cover 32. If the cover 32 is made of relatively heavy metal, or if the clips 20 are welded or riveted to the cover, the supporting portion 44 need be no wider than the gripping portion 48 of the clip.

As best shown in Fig. 4, the base 45 of the supporting portion 44 is preferably tapered inwardly as indicated at 53 from the relatively wide outer leg 42 to the relatively narrow inner leg 47. This provides clearance for mounting wheel balancing weights (not shown) upon the flange 16 closely adjacent to the inner leg 47 of the clip.

The U-shaped portion 44 of the clip extends radially inwardly from the bead 40 and is then bent axially inwardly, the base 45 of the U forming a resiliently radially deflectable arm. The inner leg 47 extends radially outwardly, and terminates in a nose portion 46, which underengages the terminal rim flange 16.

The nose portion 46 integrally connects the U-shaped portion 44 to a second, generally C-shaped, gripping portion 48 which extends radially inwardly from the nose portion 46 on the axially outer side thereof, and then radially outwardly past the terminal rim flange 16. The radially outer arm 49 of the C-shaped portion extends axially inwardly, preferably at least slightly beyond the nose portion 46, and engages the radially outer surface 36 of the flange 16. The C-shaped portion 48 pinches the flange 16 and holds the nose portion 46 firmly in engagement with the inner side of the flange.

The nose portion 46 is preferably straight in the circumferential direction, extending in a chord across the arc of the rim flange 16 so that the edges 51 of the nose portion bite into the flange to prevent indexing, i.e., rotation of the cover 32 with respect to the wheel 10 about the wheel axis.

The clip 20 is capable of exerting a remarkable retaining force regardless of dimensional variations in the wheel 10 and the cover 32. The clip 20 is relatively easily pushed into place on the flange 16 and is capable of retaining the cover 32 on the face of the wheel 10 through all service conditions, and yet may be removed by means of a simple pry-off tool such as a screwdriver, a tire iron or the like applied between the cover and the wheel at any point near the clip. Moreover, the clip 20 may be readily removed by the application of relatively light pry-off pressure at the edge 50 of the outer arm 49 of the C-shaped portion.

Retaining clips according to the present invention are not dependent upon snap spring force developed across the full diameter of the wheel to which they are attached, but rather, each one of the clips by itself provides a strong attaching force. The C-shaped, gripping portion 48 serves to hold the nose portion 46 firmly in engagement with the inner side of the terminal flange 16, and the supporting portion 44 yields much more easily than the gripping portion to accommodate relatively large radial displacements of the wheel with respect to the cover without loosening the grip of the gripping portion 48.

Each of the portions 44 and 48 is cantilever supported, and the effective length of the supporting portion 44 in a direction parallel to the axis of the wheel is greater than that of the gripping portion 48, so that when the clip 20 is subjected to distorting stresses the supporting portion 44 yields in a radial direction more easily than the gripping portion 48. The difference in yield, according to known engineering principles, is proportional to the third power of the ratio between the effective lengths of the two portions 44 and 48. Therefore, the supporting portion 44 yields and is distorted to accommodate dimensional variations between the cover and the wheel and to permit flexure of the wheel in service without significantly loosening the grip of the C-shaped portion 48 upon the terminal flange 16.

Despite their relatively strong retention characteristics, clips according to the invention are relatively easily forced into engagement with the wheel flange. This may be explained at least in part by the pivoting action occasioned by axial movement of the cover 32 with respect to the wheel 10, in conjunction with the curvature of the terminal flange 16. When the cover 32 is first applied to the wheel, the edge 50 of the outer arm 49 and the nose portion 46 of the clip come into contact with the edge of the flange 16 and resist axially inward movement of the cover upon the wheel. As force is applied to the cover to drive the clip 20 upon the flange 16, the clip 20 is pivoted slightly in a counterclockwise direction as viewed in Fig. 2, due to the leverage of the supporting portion 44, bringing the opening between the nose portion 46 and the edge 50 into alignment with the direction of the flange 16 at its outer edge, and facilitating movement of the clip 20 into its final position on the flange. After the clip 20 is in position, however, it strongly resists an axially outward force applied to the cover, because such a force tends to pivot the clip 20 in the opposite direction, that is, clockwise as viewed in Fig. 2, causing the C-shaped portion 48 to pull the nose portion 46 more tightly into engagement with the flange. In other words, due to the pivoting action involved, an axially outward force exerted on the cover 32 pivots the clip 20 into increasingly tight wedging engagement with the flange 16.

The clip 20 may be most easily dislodged from the flange 16 by axially outward pressure applied directly to the C-shaped gripping portion 48 at the edge 50 of the outer arm 49. However, the strength of the clip material is preferably selected so that a pry-off force exerted between the cover 32 and the wheel 10 at any point relatively close to the clip 20 will dislodge the clip 20 without damaging the cover 32.

What is claimed is:

1. In a wheel structure including a tire rim having an axially outwardly extending terminal flange, a wheel cover having an outer margin, a plurality of spring clips secured to said cover adjacent its margin and arranged for resiliently supporting said cover upon the wheel with said margin positioned in axially spaced relation to the terminal flange, each one of said clips comprising a gripping portion shaped to fit over the edge of the flange and to grip the flange with a pinching action, an attaching portion secured to the cover, and a connecting portion integral with said gripping and attaching portions and including as part thereof a resiliently deflectable arm extending generally axially from said gripping portion to the cover margin, said arm yielding more easily than said gripping portion in response to forces tending to dislodge the cover from the wheel whereby radial movement of said cover upon the wheel is accommodated by flexure of the clip arms without appreciably loosening the grip of said gripping portions on the wheel flange.

2. In a wheel structure including a tire rim having an axially outwardly extending terminal flange, a wheel cover having an inwardly turned bead extending around its outer margin, a plurality of spring clips retainingly seated in said bead and arranged for resiliently supporting said cover upon the wheel with said bead positioned in axially spaced relation to the terminal flange, each one of said clips comprising a gripping portion shaped to fit over the edge of the flange and to grip the flange with a pinching action, an attaching portion seated in said bead, and a connecting portion integral with said gripping and attaching portions and including as part thereof a resiliently deflectable arm extending generally axially from said gripping portion to the cover bead, said attaching portion including a radially extending axially outer leg clinched within said bead at at least two points thereon at opposite sides of said gripping portion, said arm yielding more easily than said gripping portion in response to forces to dislodge the cover from the wheel whereby radial movement of said cover upon the wheel is accommodated by flexure of the clip arms without appreciably loosening the grip of said gripping portions on the wheel flange.

References Cited in the file of this patent

UNITED STATES PATENTS

| | | |
|---|---|---|
| 2,137,416 | Rubsam | Nov. 22, 1938 |
| 2,351,655 | Aske | June 20, 1944 |
| 2,404,389 | Lyon | July 23, 1946 |
| 2,749,186 | Wood | June 5, 1956 |